Feb. 20, 1940.  A. C. GRANT  2,191,141
HEATING APPARATUS
Filed Jan. 18, 1934
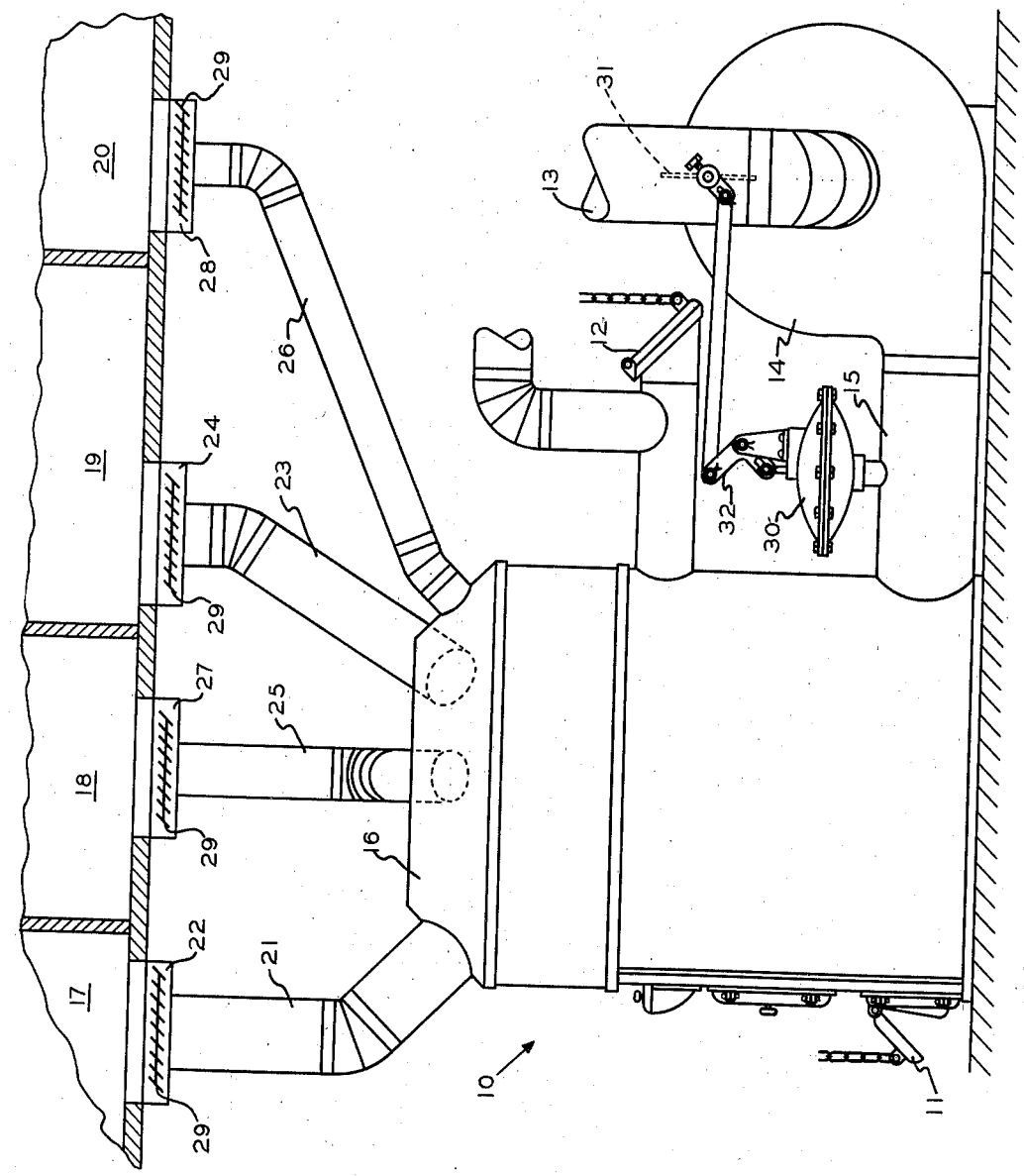
Inventor
ARTHUR C. GRANT
By George H. Fisher
Attorney Patented Feb. 20, 1940

2,191,141

UNITED STATES PATENT OFFICE 2,191,141

HEATING APPARATUS

Arthur C. Grant, St. Paul, Minn., assignor to Minneapolis-Honeywell Regulator Company, Minneapolis, Minn., a corporation of Delaware Application January 18, 1934, Serial No. 707,080

8 Claims. (Cl. 98—33)

The present invention relates to the art of distributing fluids and the problems to be solved by this invention and the manner in which they are solved will be discussed in connection with a warm air heating system but it is to be expressly understood that the invention has utility in systems of fluid distribution other than warm air heating systems.

In a warm air heating system, it is usual to provide a warm air furnace or other means for heating the air, together with pipes or ducts for leading the heated air to the various compartments to be heated. It is well recognized that various compartments require varying volumes of heated air per unit of time by reason of differences in size, differences in heat loss and, in some instances, because it is desired to maintain varying temperatures in various compartments.

In order to obviate the necessity of separate controlling means for controlling the flow of air to each of the compartments, it has been usual to provide a single control responsive to the temperature of only one of the compartments whereby the temperature of that compartment is maintained at the desired point and to maintain the desired temperatures in the other compartments by arranging the ducts or pipes in such manner that the proper amount of heated air is distributed to each of these compartments. This is generally accomplished by providing ducts of different sizes and in some instances additional means such as individual dampers are also provided in order that the proportional amount of the total air delivered to each compartment in response to the control in the controlling compartment may be properly adjusted.

Such systems are satisfactory when all of the ducts are open so that the proper balance in the flow of air to all of the compartments can be maintained by reason of the aforementioned proper design of the ducts. However, it is often desired to block off the flow of air to one or more of the compartments. When this is done, approximately the same total volume of air is then available for a lesser number of compartments and inasmuch as the ducts have been arranged to give the proper flow of air to each compartment only when all of the ducts are open, the distribution or balance is upset. This means that while the main controlling compartment is maintained at the desired temperature, the other compartments may be maintained at temperatures which are either higher or lower than contemplated and desired.

In order to obviate this difficulty, in some instances, the various ducts have been provided with returns or by-passes whereby, when a compartment is closed off, the flow of air while being prevented from reaching the compartment is allowed to flow through the duct in order that the proper distribution will be maintained. Obviously, such a remedy is expensive because of the additional duct work since this by-pass air should be returned to the warm air furnace and if it is not returned, it necessarily follows that a large amount of heat is being wasted. The present invention therefore contemplates a simple arrangement whereby the desired distribution of air to the various compartments heated by a warm air furnace is maintained when the flow of air through one or more of the ducts leading to the compartments is completely shut off.

One of the objects of the present invention is the provision of a system of distributing fluid to a plurality of points of use having different requirements in which the distribution system is arranged to give the proper distribution of fluid to all of the points of use when all of them are in operation, together with means for automatically maintaining the proper distribution to the remaining points of use when one or more of the points of use is rendered inoperative.

A further object of the invention is the provision of an air distribution system wherein air is adapted to be distributed through properly arranged ducts or pipes so that different desired flows or volumes of air are delivered to the desired points, together with means for automatically maintaining the same flow through those ducts still in operation when some of the ducts are closed off so as to prevent the flow of air therethrough.

Another object of the invention is the provision of a warm air heating system of the type wherein a plurality of ducts leading to a plurality of compartments to be heated are proportioned or arranged to give the desired flow or volume or proportion of air to each and every one of the compartments when all of the ducts are open to the passage of air and means for maintaining this proper proportion or flow or volume to those ducts still in operation when one or more of them is placed out of operation and the flow of air therethrough obstructed.

More specifically, an object of the present invention, is the provision of a fluid distribution system by which varying volumes of fluid are delivered per unit of time to a plurality of points of use having different volume requirements, and providing automatic means for maintaining the delivery pressure constant whereby when delivery of fluid to one of said points is obstructed, the volume delivered to the remaining points per unit of time remains constant.

In the embodiment to be hereinafter described, a blower or fan serves to pass air through a warm air furnace and then through a plurality of properly proportioned ducts to a corresponding number of rooms or compartments and a device responsive to the delivery air pressure operates a damper to limit the total quantity of air moved by the fan or blower per unit of time whereby the air delivery pressure and the flow of air through each duct that is in operation remains constant.

Further objects of the invention will be found in the detailed description, the appended claims and the drawing.

For a more complete understanding of the invention, reference may be had to the following detailed description and the accompanying single drawing which is a diagrammatic showing of one application of the instant invention.

Referring to this single drawing, the invention is shown as applied to a warm air heating system which includes a warm air furnace generally indicated at 10. The heat output of the furnace is shown as being controlled by the ordinary draft damper 11 and usual check damper 12. Air is supplied to the furnace 10 by means of a return pipe 13 which communicates with a blower 14, preferably electrically operated. The blower discharges this air into the furnace 10 through a pipe or duct 15. The air then flows through the furnace and into the usual warm air heating chamber 16 thereof, where the air is heated, from hence it is lead by suitable ducts or pipes to the rooms or compartments to be heated. In the instant embodiment of the invention, four rooms 17, 18, 19 and 20 are illustrated. The room 17 requires more heat per unit of time than any of the other rooms, perhaps because of its exposure or size or the temperature which it is desired to maintain therein, so a large duct 21 connects with the air heating chamber 16 and a register 22 located in the room 17. The room 19 as shown requires a smaller amount of heat per unit of time as indicated by the fact that the duct 23 leading from air heating chamber 16 to the register 24 of room 19 is slightly smaller than the duct 21. In a similar manner, two progressively smaller ducts 2 and 26 lead from air heating chamber 16 to registers 27 and 28 located respectively in rooms 18 and 20. Each of the registers is provided with the usual shutter 29 whereby any one of the ducts 21, 25, 23 or 26 may be shut off so as to interrupt the flow of air therethrough and to the corresponding room 17, 18, 19 or 20.

With the arrangement thus far described, the ducts 21, 25, 23 and 26 have been proportioned in such manner that when all of them are open to the flow of air, the proper proportional part of the total air delivered by the blower 14 and heated by the furnace 10 will be delivered to each of the rooms. With no additional mechanism, if the register 22 leading to room 17 were shut off, the total amount of air delivered by blower 14 would thereupon be distributed to the three remaining rooms 18, 19 and 20. This would result in an increase in the velocity of the air flowing through the respective ducts 23, 25 and 26. Such an increase in velocity is undesirable for several reasons. For one thing, the velocity of air flowing into the room has a bearing upon the quickness of response upon the main controlling thermostat located in some one of the rooms with the result that changes in velocity of the air delivered to the rooms results in changes in the response of the heating system. Furthermore, an increased velocity may set up an increased circulation within the room itself to such an extent as to make the occupants thereof uncomfortable. Also, the velocity may increase to such an extent as to cause undesirable noises. Furthermore, and most important, is the fact that because the remaining three ducts 23, 25 and 26 have different sizes, and therefore different resistances, the distribution of air or the proportion of the total air distributed to each of the remaining rooms 18, 19 and 20 will change from that desired and contemplated in originally laying out the heating system so that the desired temperatures will not be maintained in those rooms which do not contain the control device.

To overcome these detrimental effects, the present invention provides a pressure responsive device herein shown as a diaphragm mechanism of well-known construction and operation, indicated at 30. This diaphragm mechanism responds to the pressure on the outlet side of blower 14 and therefore responds to the pressure in the furnace or is a measure of the air delivery pressure. The return 13 is provided with a damper 31 and suitable linkage 32 interconnects the damper 31 and the diaphragm mechanism 30. Now as the pressure of the delivered air within the furnace or duct 15 rises, due to closing off of one of the delivery ducts, the diaphragm in the diaphragm mechanism 30 will lift and move the damper 31 towards closed position so as to reduce the amount of air delivered by the blower 14 per unit of time. In this manner, a constant air delivery pressure is maintained and, as a result, the flow of air through each of the ducts 21, 25, 23 and 26 will always remain constant.

With the parts in the position shown in the drawing, all of the ducts 21, 25, 23 and 26 are open and the blower 14 is delivering a maximum quantity of air and just maintaining the pressure at the desired point as indicated by damper 31 being in wide open position. Now if the register 22 should be closed so as to stop the flow of air through duct 21 and to room 17, the total flow of air in attempting to pass through ducts 25, 23 and 27 must necessarily increase in velocity with the result that the air delivery pressure or the air pressure in duct 15 will increase. The diaphragm in diaphragm mechanism 30 will therefore be raised and the damper 31 partially closed. The total air delivered by blower 14 will thereupon decrease and the velocity of the air passing through pipe 25, 23 and 26 will return to normal as will the pressure in duct 15. In this manner, by maintaining a constant pressure in passage 15 or a constant air delivery pressure, by limiting the air delivered by blower 14, there will always be a constant flow or velocity of air through whichever of the ducts 21, 25, 23 and 26 may happen to be open so that the amount of air delivered to each room per unit of time always remains constant when its respective duct is open. It therefore follows that the proportion of air delivered to each of the rooms will likewise remain constant. It is contemplated that the draft damper 11 and check damper 12, as well as the blower 14, will be controlled by a thermostat located in some one of the compartments 17, 18, 19 or 20 in any of the well-known manners of control such as that disclosed in Edward F.

Edgecombe, Jr., Patent Re. 15,531 which issued January 23rd, 1923.

While the invention has been explained in connection with the distribution of air in a warm air heating system, it will be apparent that it is likewise applicable to the delivery of air from air conditioners and other air treating devices and for that matter to the distribution of air or any other fluid wherein it is desired to distribute varying quantities of fluid to a plurality of points per unit of time and when under some conditions, it is desirable to render a portion of the distribution system inoperative. Furthermore, many changes can be made by those skilled in the art without departing from the spirit of the invention and I therefore intend to be limited only by the scope of the appended claims.

I claim:

1. A distribution system for circulating fluid, comprising, in combination, a chamber, means for conveying the fluid from said chamber to a plurality of points of use of different requirements in volume per unit of time, means located on the upstream side of said points of use for circulating the fluid from said chamber through said conveying means and to said points of use, means for at least partially blocking off the flow of fluid to one of said points of use and through corresponding parts of said conveying means, and means to automatically maintain a constant fluid pressure on said conveying means including a device constantly responsive to the pressure produced by said circulating means on its downstream side but ahead of said points of use.

2. In an air conditioning system, in combination, an air conditioning chamber, duct means connecting said air conditioning chamber to a plurality of spaces to be conditioned and requiring different amounts of conditioned air per unit of time, an inlet duct for said air conditioning chamber, circulating means located on the upstream side of said spaces and arranged to pass air through said inlet duct, air conditioning chamber and duct means to said spaces, means to restrict the effective area of at least a portion of said duct means, damper means located in said inlet duct, and a device responsive to the pressure on the downstream side of said circulating means but ahead of said spaces in control of said damper means to maintain said pressure constant.

3. A system of the class described, comprising, in combination, a warm air furnace, a plurality of enclosed spaces requiring different volumes of air per unit of time heated thereby, a plurality of ducts associated with said spaces and furnace and arranged to furnish the proper amount of air to each of said spaces when all of said spaces are receiving air, means located on the upstream side of said ducts for inducing a flow of air from said furnace and through said ducts to said spaces, means for closing off at least a portion of one of said ducts, and means to automatically maintain a constant pressure on said ducts including a device responsive to the pressure between said air flow inducing means and said ducts.

4. In combination, a warm air furnace, an inlet duct for the furnace, duct means connecting the furnace to a plurality of compartments to be heated and requiring different proportions of the total air delivered through said duct means, said duct means being arranged to deliver the proper proportion of air to each compartment under normal conditions, fan means located on the upstream side of said duct means for inducing the flow of air through the inlet duct, furnace and duct means to the compartments, damper means cooperative with the inlet duct to restrict the size of the opening thereof, means to restrict the effective opening of at least a portion of said duct means, and a device constantly responsive to the pressure between said duct means and said air flow inducing means in control of said damper means to maintain such pressure constant at all times.

5. In an air conditioning system for conditioning the air in a plurality of spaces, the combination of, an air conditioning chamber having means for conditioning air which is circulated therethrough, duct means for conveying conditioned air from the air conditioning chamber to the plurality of spaces to be conditioned, fan means for circulating conditioned air from the air conditioning chamber through the duct means to the spaces to be conditioned, dampers associated with said duct means for regulating the amount of conditioned air delivered to each space for maintaining desired air conditions in each space, and means including means responsive to the static pressure on the discharge side of the fan means for regulating the amount of air circulated by the fan means to maintain the static pressure in the duct means substantially constant whereby the velocity of the conditioned air delivered to each space remains substantially constant regardless of the amount of air delivered to each space.

6. In an air conditioning system for conditioning the air in a plurality of spaces, the combination of, an air conditioning chamber having means for conditioning air which is circulated therethrough, duct means for conveying conditioned air from the air conditioning chamber to the plurality of spaces to be conditioned, fan means for circulating conditioned air from the air conditioning chamber through the duct means to the spaces to be conditioned, dampers associated with said duct means for regulating the amount of conditioned air delivered to each space for maintaining desired air conditions in each space, damper means located on the inlet side of the fan means for regulating the amount of air circulated by the fan means, and means responsive to the static pressure on the discharge side of the fan means for positioning said damper means to maintain the static pressure of the air in said duct means substantially constant whereby the velocity of the air delivered to each space remains substantially constant regardless of the amount of air delivered to each space.

7. In an air conditioning system for conditioning the air in a plurality of spaces, the combination of, an air conditioning chamber having means for conditioning air which is circulated therethrough, duct means for conveying conditioned air from the air conditioning chamber to the plurality of spaces to be conditioned, an inlet duct for conveying air to the air conditioning chamber, fan means located between the inlet duct and the air conditioning chamber for circulating air from the inlet duct through the air conditioning chamber and duct means to the spaces to be conditioned, dampers associated with said duct means for regulating the amount of conditioned air delivered to each space for maintaining desired air conditions in each space, and means including means responsive to the static pressure on the discharge side of the fan means for regulating the amount of air circulated by the fan means to maintain the static pressure in the duct means substantially constant whereby the velocity of the conditioned air delivered to each space remains substantially constant regardless of the amount of air delivered to each space.

8. In an air conditioning system for conditioning the air in a plurality of spaces, the combination of, an air conditioning chamber having means for conditioning air which is circulated therethrough, duct means for conveying conditioned air from the air conditioning chamber to the plurality of spaces to be conditioned, an inlet duct for conveying air to the air conditioning chamber, fan means located between the inlet duct and the air conditioning chamber for circulating air from the inlet duct through the air conditioning chamber and duct means to the spaces to be conditioned, dampers associated with said duct means for regulating the amount of conditioned air delivered to each space for maintaining desired air conditions in each space, damper means located on the inlet side of the fan means for regulating the amount of air circulated by the fan means, and means responsive to the static pressure on the discharge side of the fan means for positioning said damper means to maintain the static pressure of the air in said duct means substantially constant whereby the velocity of the air delivered to each space remains substantially constant regardless of the amount of air delivered to each space.

ARTHUR C. GRANT.